(12) United States Patent
Marin et al.

(10) Patent No.: US 11,292,017 B2
(45) Date of Patent: Apr. 5, 2022

(54) INSULATED ELECTROSTATICALLY ASSISTED SPRAYING EXTENDER

(71) Applicant: Tecnologia Sul Brasileira Indústria de Máquinas LTDA, Santa Maria (BR)

(72) Inventors: Adriano Marin, Porto Alegre (BR); Leonardo Kozoroski Veiga, Santa Maria (BR)

( * ) Notice: Subject to any disclaimer, the term of this patent is extended or adjusted under 35 U.S.C. 154(b) by 93 days.

(21) Appl. No.: 16/861,303

(22) Filed: Apr. 29, 2020

(65) Prior Publication Data

US 2020/0254467 A1 Aug. 13, 2020

Related U.S. Application Data

(63) Continuation of application No. PCT/BR2018/050438, filed on Nov. 26, 2018.

(51) Int. Cl.
*B05B 5/043* (2006.01)
*B05B 5/053* (2006.01)
*B05D 1/04* (2006.01)

(52) U.S. Cl.
CPC ............ *B05B 5/043* (2013.01); *B05B 5/0533* (2013.01); *B05D 1/04* (2013.01)

(58) Field of Classification Search
None
See application file for complete search history.

(56) References Cited

U.S. PATENT DOCUMENTS

| 2,890,388 | A | * | 6/1959 | Croskey | B05B 5/0535 |
| | | | | | 361/228 |
| 3,900,000 | A | * | 8/1975 | Gallen | B05B 5/0418 |
| | | | | | 118/630 |
| 4,343,433 | A | * | 8/1982 | Sickles | B05B 7/068 |
| | | | | | 239/3 |
| 4,489,894 | A | * | 12/1984 | Marchant | A01M 7/005 |
| | | | | | 239/693 |

(Continued)

FOREIGN PATENT DOCUMENTS

BR 102013011205 A2 12/2014
BR 2021014002428 U2 10/2015

(Continued)

OTHER PUBLICATIONS

PCT/BR20 18/050438 ; Nov. 26, 2018; ISR Jul. 2, 2019.

*Primary Examiner* — Jethro M. Pence
(74) *Attorney, Agent, or Firm* — Peter Ganjian; Patent Law Agency, LLC

(57) ABSTRACT

An insulated electrostatically-assisted insulated spraying extender (10) is described, which is installed on the spraying bar (100) of a spraying device and positioned adjacent to a hydraulic nozzle (20) that atomizes the spray solution, said extender (10) being equipped with an insulated internal shaft (12) for the passage of the power supply cable (30) and the placement of an encapsulated electric device (13) that feeds the induction electrode (151) surrounding the opening (21) of the hydraulic nozzle (20), causing the dielectric rupture of atomized drops, eliminating or decreasing the wetting of the induction electrode (151) and of the power supply cable (Continued)

(30), as well as of other electric parts that affect the efficiency and the full operation of the spraying nozzle, while hindering leakage of the electric current through cable (30) by contacting any section of the machine structure.

3 Claims, 4 Drawing Sheets

(56) References Cited

U.S. PATENT DOCUMENTS

| | | | |
|---|---|---|---|
| 4,621,268 A | 11/1986 | Langrick | |
| 4,735,364 A | 4/1988 | Marchant | |
| 5,086,972 A * | 2/1992 | Chang | B05B 5/0536 239/3 |
| 5,520,715 A * | 5/1996 | Oeftering | B06B 1/20 75/335 |
| 7,553,377 B1 * | 6/2009 | Chen | B05B 5/08 118/500 |
| 8,746,597 B2 | 6/2014 | Sides | |
| 8,985,051 B2 | 3/2015 | Crawford | |
| 2004/0195403 A1 * | 10/2004 | Atterbury | B05B 5/03 239/690 |
| 2020/0282411 A1 * | 9/2020 | Li | B05B 5/043 |

FOREIGN PATENT DOCUMENTS

| | | |
|---|---|---|
| JP | 5797906 B2 | 10/2015 |
| WO | WO9000446 A1 | 1/1990 |
| WO | WO2017063065 | 4/2017 |

\* cited by examiner

INSULATED ELECTROSTATICALLY ASSISTED SPRAYING EXTENDER

CROSS-REFERENCE TO RELATED APPLICATIONS

This Application is a CONTINUATION application claiming the benefit of priority of the co-pending International Patent Application No. PCT/BR2018/050438 with an international filing date 26 Nov. 2018 that designated the United States, which claims the benefit of priority of Federal Republic of Brazil Application No. BR102017026883-7, filed 13 Dec. 2017, the entire disclosures of each (and all) of which applications are expressly incorporated by reference in their entirety herein.

FIELD OF THE INVENTION

The present invention describes an insulated electrostatically assisted spraying extender installed on the spraying bar of a spraying device and positioned adjacent to a hydraulic nozzle that atomizes the spray solution, said extender being equipped with an insulated internal shaft for the passage of the power supply cable and the positioning of an encapsulated electric device that feeds the induction electrode surrounding the opening of the hydraulic nozzle, causing the dielectric rupture of atomized drops, eliminating or decreasing the wetting of the induction electrode and of the power supply cable, as well as of other electric parts affecting the efficiency and full operation of the spraying nozzle, while impairing leakage of the electric current through the cable by contact with any section of the structure of the machine.

BACKGROUND OF THE INVENTION

An alternative to improve the application of spray solution to leaves in reduced volume and decrease drift loss is electrostatically-assisted spraying. This system presents better coverage than traditional methods as it generates thin, homogeneous, electrically charged drops, reducing dripping and drifting and allowing for a larger number of drops to be applied to the crop. According to this new concept, positively charged thin drops are attracted to leaves, branches and trunks, which have a negative charge, acquiring a very high speed towards the target, virtually preventing evaporation from taking place.

The technical literature advocates that electrostatic spraying is a promising alternative for reducing losses during the application of pesticides, easily reducing a substantial amount in the active ingredients recommended for application and improving biological efficiency as well.

In addition to improving control efficiency, electrostatic spraying reduces the effects of insecticides on living organisms found in soil, since losses to the soil are up to 20 times lower than in conventional spraying.

In electrostatic spraying, a hydraulic nozzle secured to the spraying shaft has a spray solution inlet and an air inlet. Air moves at a very high speed through the tip and, once it meets the solution, it is transformed into spraying droplets by the impact. The atomized drops pass through an electrode, where electrons are induced over the liquid flow, drops of high electrostatic charge being taken by an air flow while being attached to the target by a strong force of attraction (a grounded object, in this case, the plants). (MAX-CHARGE, 2000).

This principle is based on Coulomb's law, which claims that opposites attract, or, more specifically, different electrical spraying charges attract one another. Electrically charged drops result in a force of attraction that is 75 times higher than the force of gravity. This means that electrically charged drops will reverse their direction and movement against gravity, moving towards the surfaces to which the product should be applied. Due to Coulomb's forces, once sprayed particles get electrically charged, they will be attracted to an object, lining up and wrapping the object on all sides. (MAX-CHARGE—(ESS) Electrostatic Spraying System, Inc.).

To electrify the drops produced by the hydraulic nozzles, the solution should be maintained at zero voltage, and the drops acquire charge in the presence of an intense electrostatic field formed between the induction electrode maintained at high voltage and the hydraulic nozzle. The induction electrode must be positioned in the spray edge region (atomization zone), at a distance short enough to avoid spark discharge between the electrode and the spray solution.

Examples of this embodiment are described in document no. WO2017063065, which describes an induction device coupled to hydraulic nozzles including a supporting structure for an induction electrode made of a highly hydrophobic material and a small-sized stainless steel, annular geometry induction electrode made of stainless steel wire which operates at low voltage magnitudes in order to reduce the phenomenon of backwards attraction of electrically charged drops, which causes overwetting of the spraying device, directly affecting its operational efficiency and, as a result, the quality of the electrostatic deposition process, and also prevents excess liquid buildup on surfaces exposed to the device.

Document BR202014002428-5 refers to a constructive arrangement applied to an electrostatic sprayer in which the spraying nozzle is extended. Therefore this constructive form provides elongation of the induction ring, moving it away from the locking nut to which is attached the tip of the cone, preventing the liquid to be sprayed from flowing, the flow inlet occurring through the base of the spraying nozzle provided with an anti-drip system connected to a shunt of the flow inlet.

U.S. Pat. No. 4,343,433 describes an electrostatic spraying device capable of preventing electrical leakage from liquid drops, comprising a nozzle, a spray tube and a handle, the two ends of the spray tube being respectively connected to the nozzle piece and the handle. The nozzle piece comprises a base fixed at one end of the spray tube, a nozzle fixed to the base, a ring electrode disposed around the nozzle and a support piece extending towards the outer edge of the ring electrode. The spray tube is provided with an auxiliary handle with a lowered ring cavity that prevents the entry of drops of liquid.

However, in these state-of-the-art documents, the drops produced in the atomization zone acquire charge with polarity opposite to that of the induction electrode, being therefore attracted to it, wetting the induction electrode and its supporting piece. The electrically charged particles line up and even wet the power supply cord. Following the wetting of the induction electrode, a short circuit is observed between the high voltage of the electrode and the hydraulic nozzle, causing the collapse of the system and strongly impairing electrification of the droplets.

To circumvent this drawback, the state-of-the-art describes pneumatic electrostatic nozzles that are characterized by providing concentric jets of air and liquid. Thus, the same air that pulverizes the liquid drags the charged droplets away from the electrode's influence, keeping it dry.

Examples of this technical solution are described in U.S. Pat. No. 4,489,894, which teaches an electrostatic spraying device comprising a supply device for spraying liquid, a spray head having a spraying liquid inlet and a spray outlet, an electrode mounted on the device in order to apply a potential difference in the region of the spray outlet, where the spray is inductively charged, and aspirating means to remove liquid deposited on the electrode.

Document GB2192351 describes a sprayer suitable for cleaning cows' udders after milking which includes an electrostatically charged spray head with a nozzle to produce a spray and an electrode surrounding the nozzle. An air flow from a pressurized air source is directed around the electrode to prevent the accumulation of liquid on it.

Document JP2008142662 describes an electrostatic spraying device provided with annular gaps arranged on a nozzle opened towards both the spray target and the opposite direction. The nozzle has a hydrophobic coating which enables the sprayed droplets to hardly get stuck on the periphery of the nozzle. In addition, a continuous air flow is provided towards the spray, blocking the entry of droplets into the nozzle.

However, in this technical solution that uses air to move the atomized droplets away from the induction ring, specific compressors are needed for feeding the spray nozzles, a very high volume of air being consumed.

Therefore, improvements have been tested in the field in order to reduce the phenomenon of backwards attraction of electrically charged droplets, which causes excessive wetting of the spraying device, the induction electrode and other electrical parts, thus affecting the efficiency and the full functioning of the spray nozzle. These seek to eliminate the need of shutting down the equipment every three hours, as recommended in the technical assistance manuals for cleaning the spray nozzles, electrodes and wires close to the nozzles.

Thus, the object of the present invention is an insulated electrostatically assisted spraying extender equipped with an external covering that provides additional protection to the internal insulator and to the power supply cable installed internally to the insulator, reducing the wetting of these components and hindering the leakage of electric current between the induction ring and the spray bar, said insulated extender not requiring periodic cleaning while being able to bear splashes of water or conductive liquid without collapsing.

DETAILED DESCRIPTION OF THE INVENTION

Figure 1:
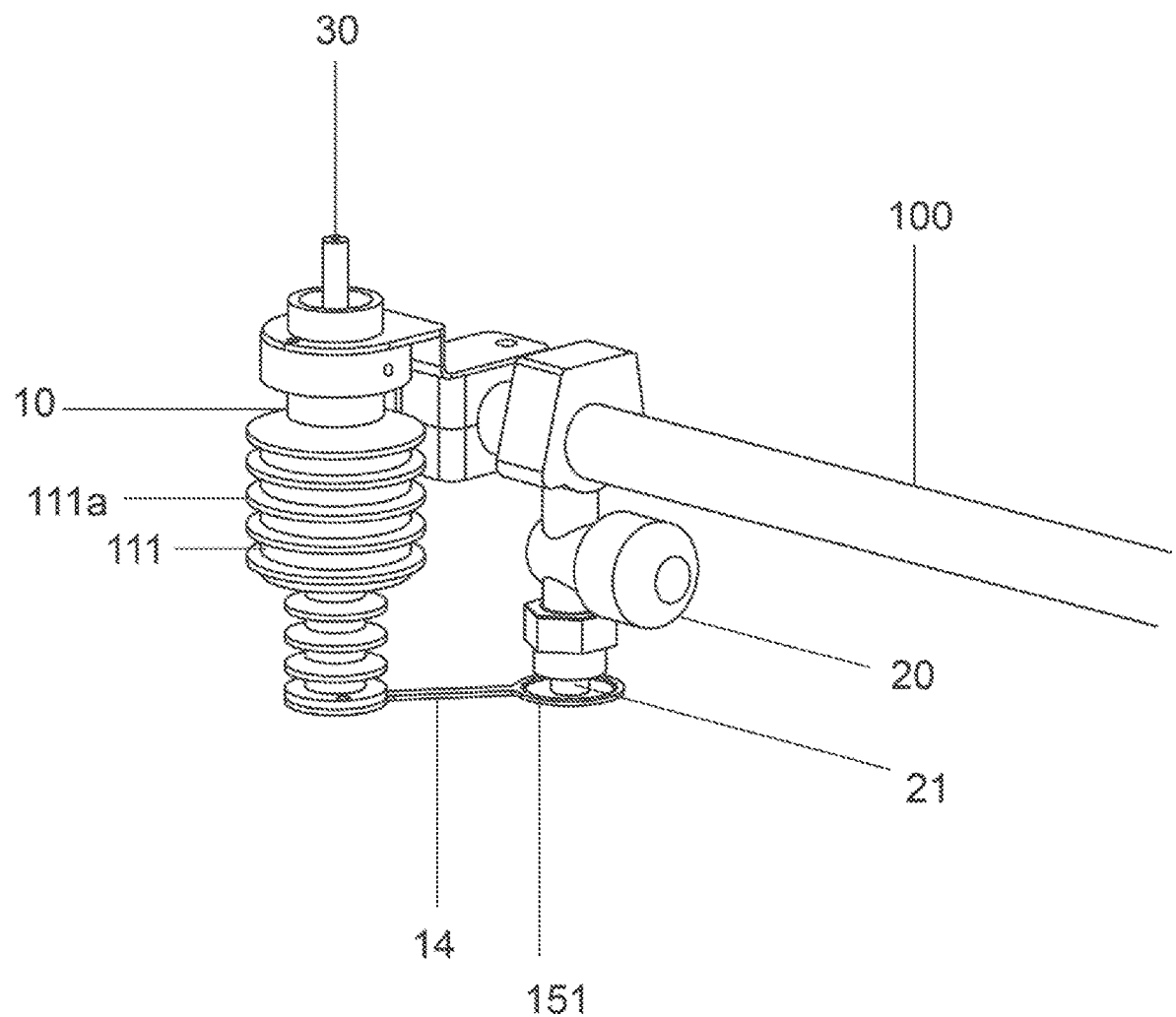
FIG. 1 shows a perspective view of the insulator and the spray nozzle attached to the spray bar of a spraying equipment.
Figure 2:
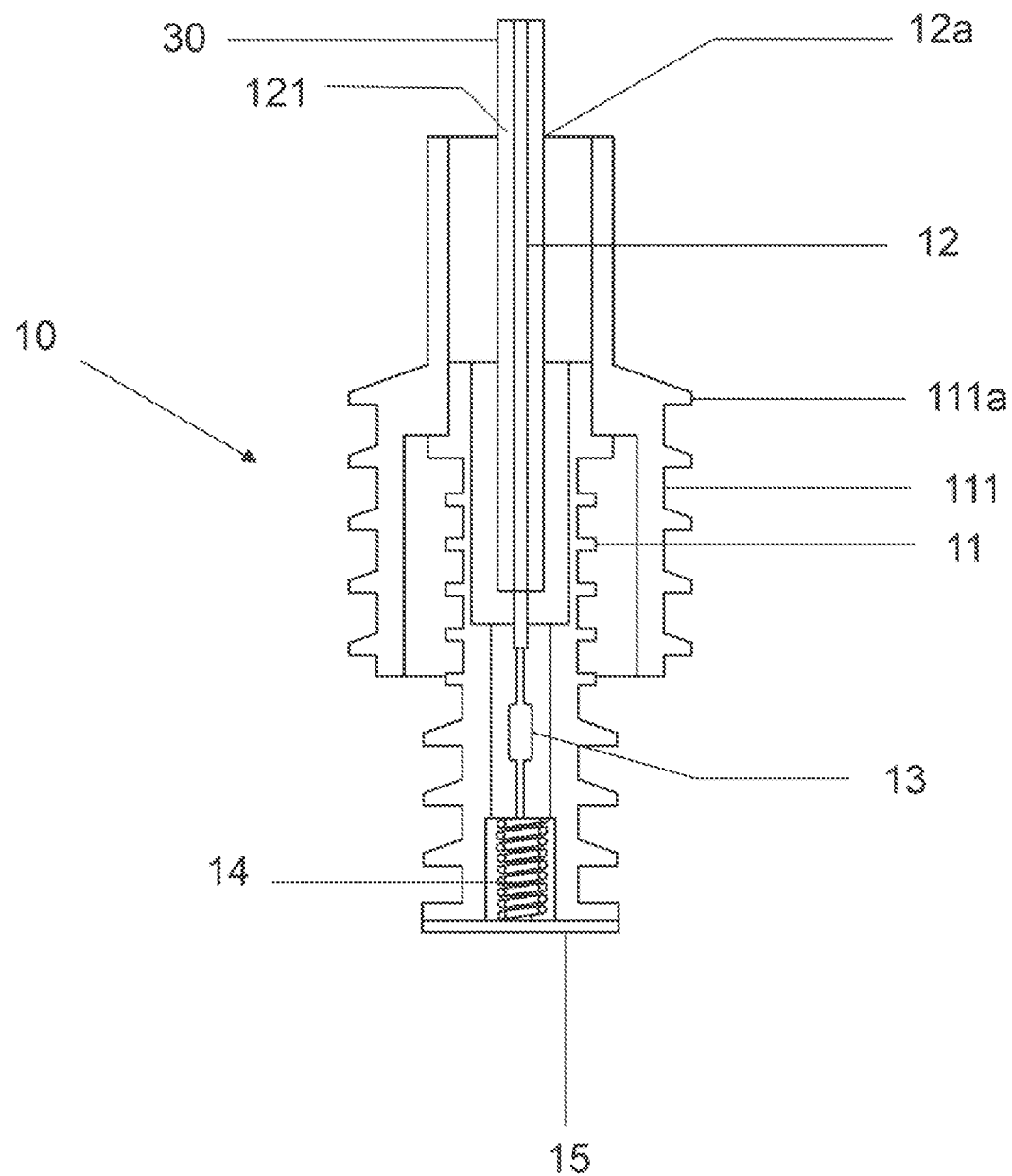
FIG. 2 shows a cross-section view of the insulator evidencing the internal insulated rod for passage of the power supply cable of the electrical device that contacts the induction electrode.
Figure 3:
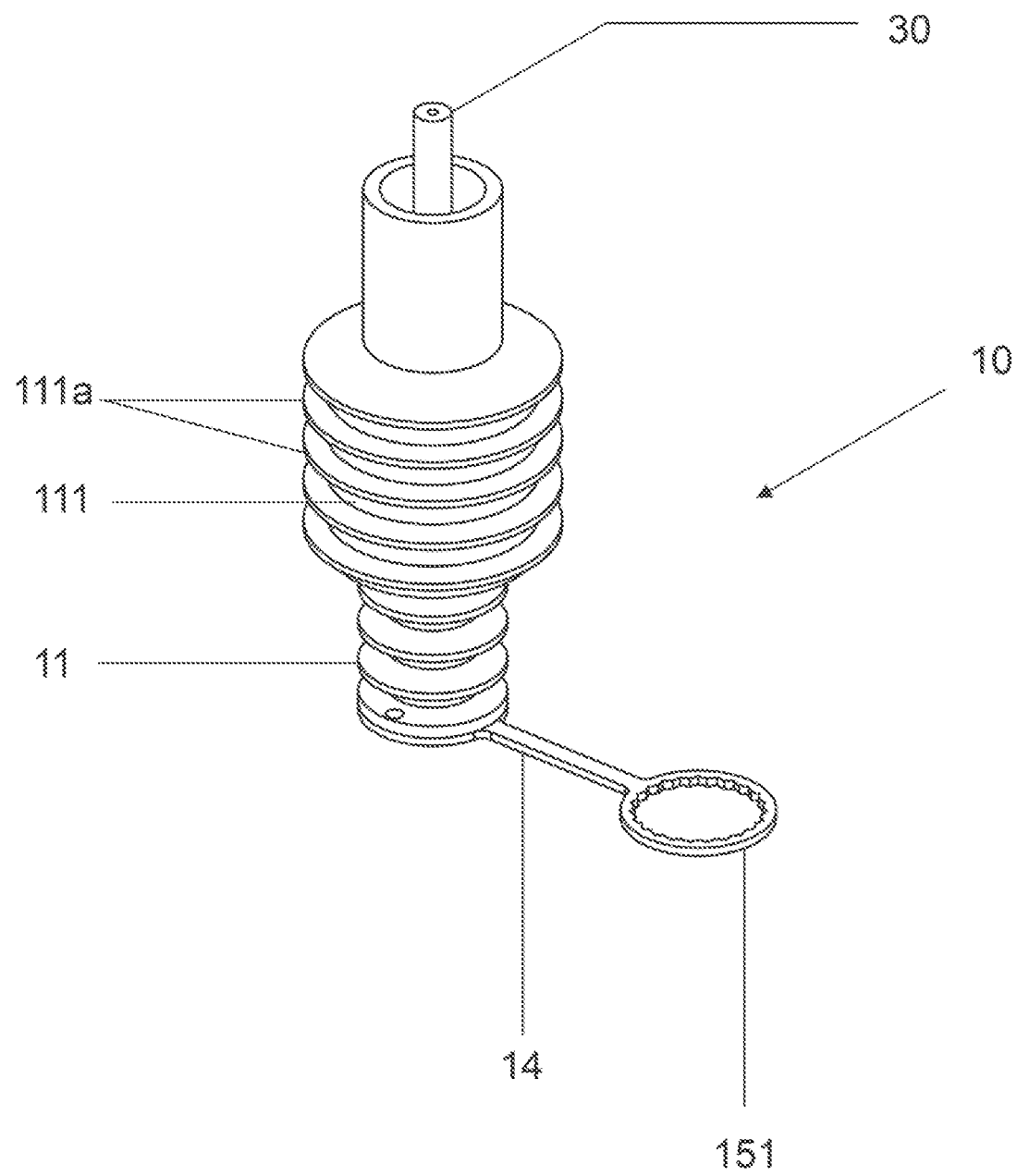
FIG. 3 shows a perspective view of the insulator with the external covering.
Figure 4:
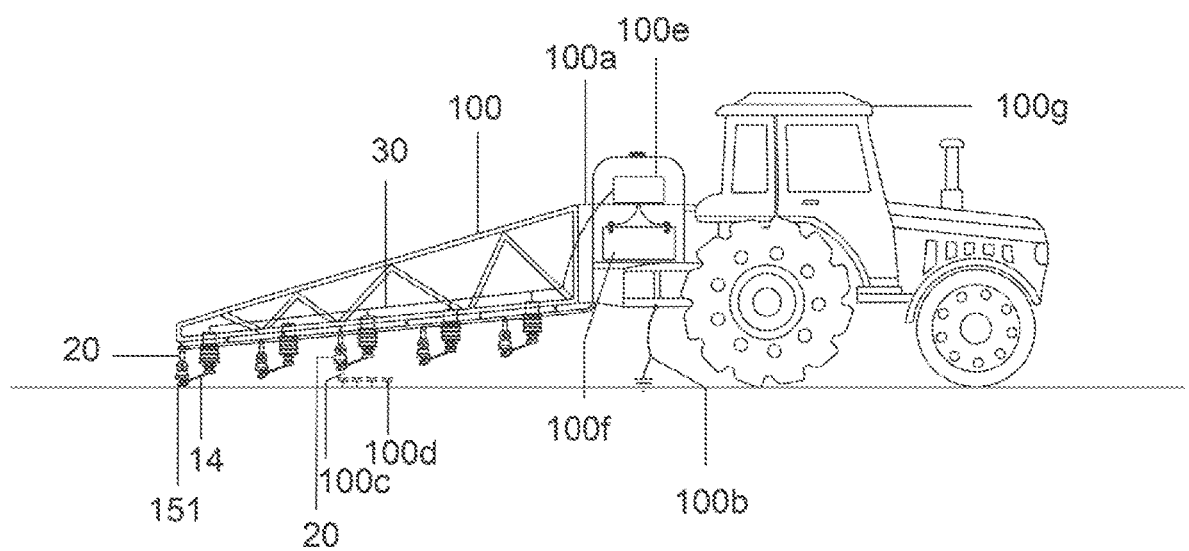
FIG. 4 is an overview illustration of the insulated electrostatically assisted spraying extender.

The electrostatically-assisted spraying extender (10), object of the present invention, is installed on the spray bar (100) of a grounded (100a) agricultural spraying equipment (100b), positioned adjacent to a hydraulic nozzle (20) which atomizes the spraying liquid droplets that are released by the nozzle (21) to be electrically charged when passing by induction electrode (151) which creates an electrostatic field that electrically charges the droplets (100c) to be directed to the surfaces (100d) where the product is to be applied.

The insulated extender (10) comprises a housing (11) made of hydrophobic material, with a surface preferably provided with fins (111a), said housing (11) being provided with an insulated internal rod (12) with an upper end (12a) provided with an opening (121) for the entry of power supply cable (30) connected, at one end, to a high voltage electronic module (100e) powered by the tractor (100q) battery (100f), and at the opposite end connected to an encapsulated electrical device (13) positioned on said insulated internal rod (12), said electrical device (13) powering said induction electrode (151).

At the lower end of the insulated rod (12), a spring (14) is arranged, on whose free ends is attached support (15) of the ring induction electrode (151), which surrounds nozzle (21) of the hydraulic nozzle (20), said fixing of the support (15) to the spring (14) facilitating the coupling to the extender (10).

The induction electrode (151) that surrounds the nozzle (21) of the hydraulic nozzle (20) induces the formation of electric charges in the liquid flow, so that the droplets are electrically charged when leaving nozzle (21) of the hydraulic nozzle (20).

Preferably, on top of the housing (11) of hydrophobic material an external covering (111) is provided with a surface preferably finned (111a) which provides additional protection to the housing (11), preventing the wetting of the insulated internal rod (12).

Extender (10) is fixed to the spray bar (100) of the spraying equipment by any support ensuring immobility to same.

The invention claimed is:

1. An insulated electrostatically-assisted spraying extender (10) installed on a spraying bar (100) of a grounded sprayer for use in agriculture, positioned adjacent to a hydraulic nozzle (20) that atomizes drops from a spraying liquid that are released through a nozzle (21) to be electrically charged when passing through an induction electrode (151) that promotes an electrostatic field that charges the drops electrically to be directed to surfaces to which a product must be applied, said insulated electrostatically-assisted spraying extender (10) being characterized by comprising a hydrophobic material casing (11) equipped with an insulated internal shaft (12) with an upper distal end portion provided with an opening (121) to introduce a power supply cable (30) that is connected on one end to a high-voltage electronic module powered by a tractor's battery and on an opposite end to an encapsulated electrical device (13) positioned on said insulated internal shaft (12), said encapsulated electrical device (13) feeding the induction electrode (151), on a lower end of the insulated shaft (12) being disposed on a spring (14) whose free ends fasten a support (15) of the induction electrode (151).

2. The insulated electrostatically-assisted spraying extender (10) according to claim 1, characterized by the hydrophobic material casing (11) surface being provided with fins.

3. The insulated electrostatically-assisted spraying extender (10) according to claim 1, characterized by a finned outer cover (111) on the hydrophobic material casing (11).

* * * * *